Jan. 16, 1934.　　W. E. AESCHBACH　　1,943,711
CLOTH MEASURING MACHINE
Filed Sept. 26, 1932　　3 Sheets-Sheet 1

Inventor
Walter E. Aeschbach
By Liverance and Van Antwerp
Attorneys

Jan. 16, 1934.  W. E. AESCHBACH  1,943,711
CLOTH MEASURING MACHINE
Filed Sept. 26, 1932   3 Sheets-Sheet 2
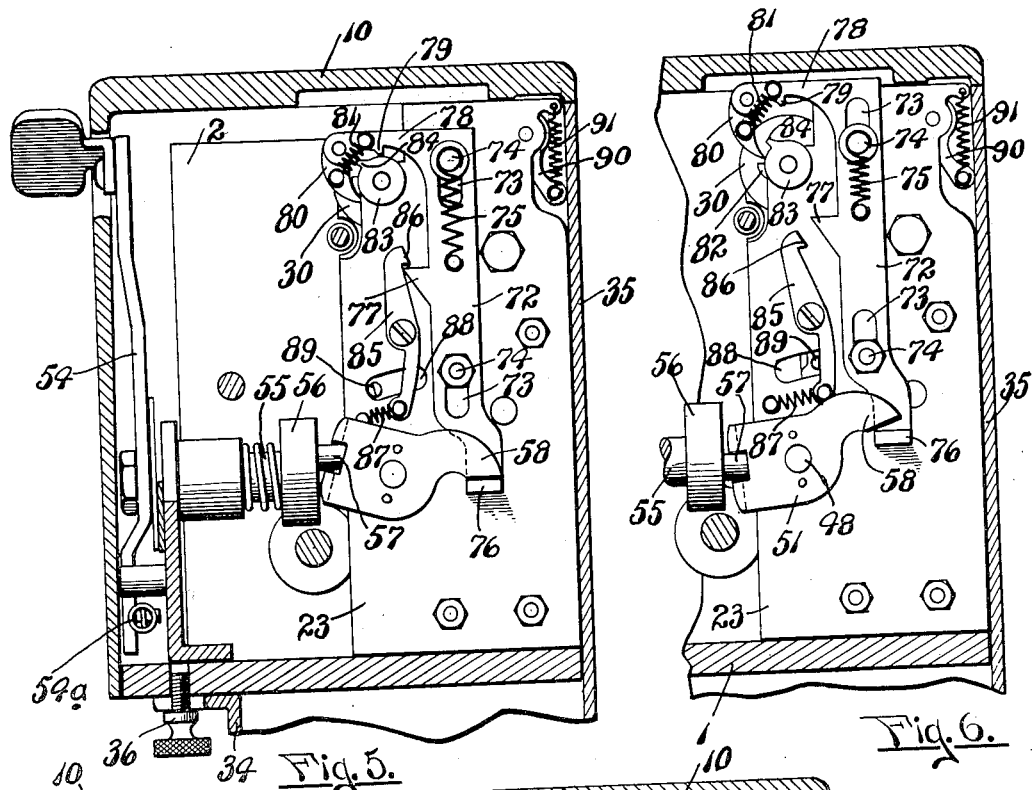
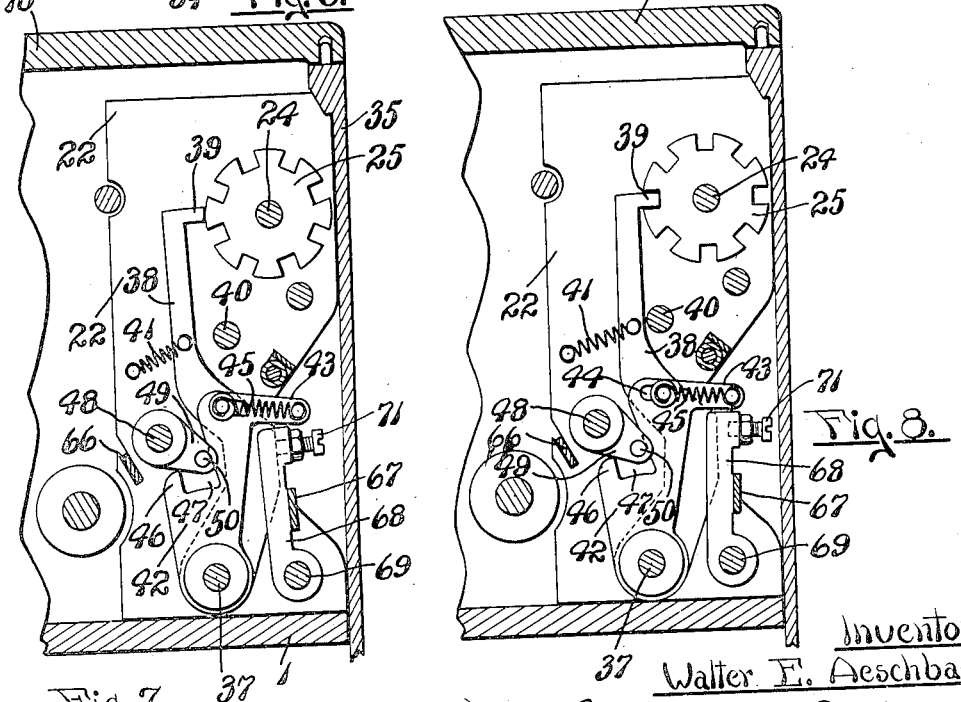
Inventor
Walter E. Aeschbach
By Liverance and Van Antwerp
Attorneys

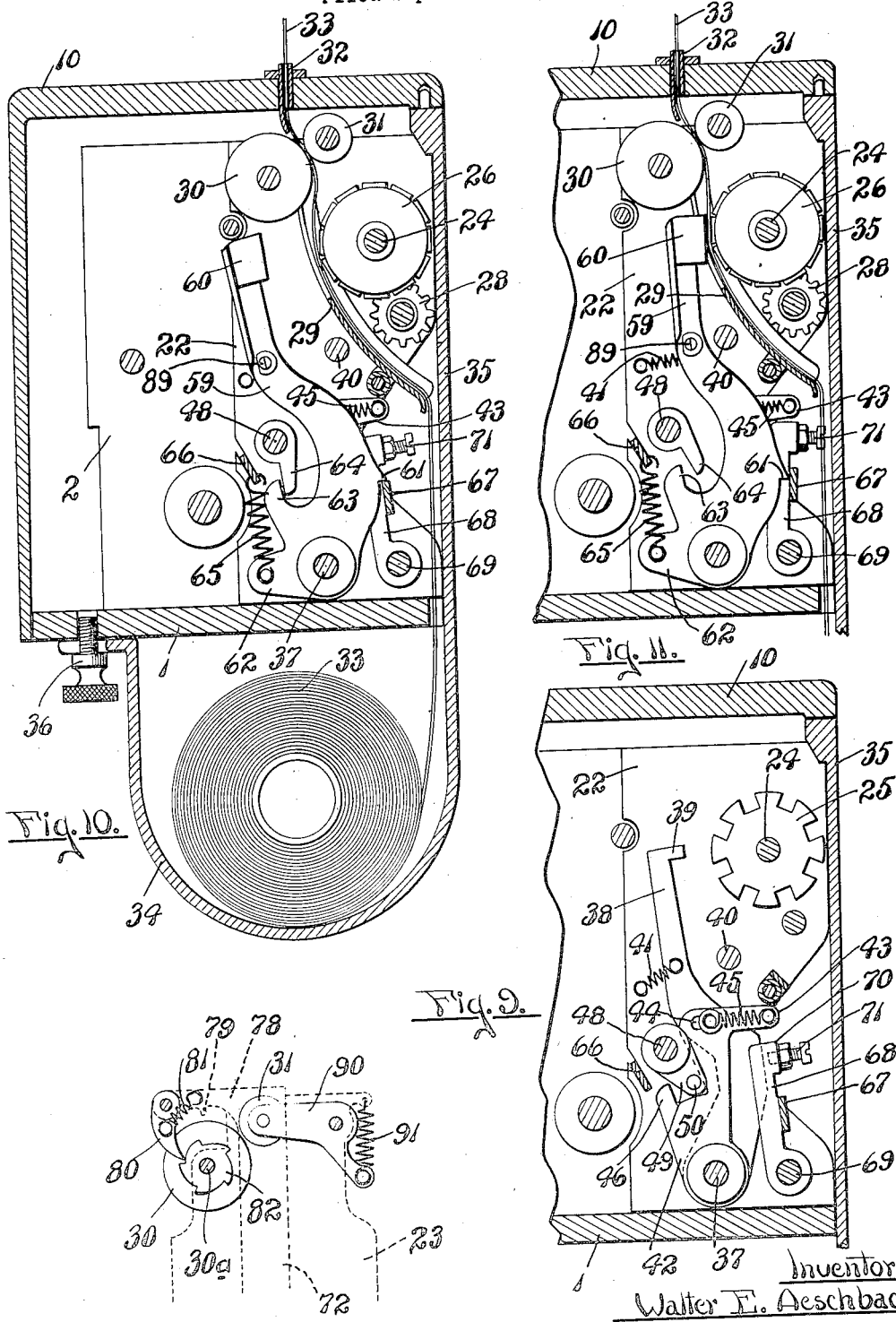

Patented Jan. 16, 1934

1,943,711

UNITED STATES PATENT OFFICE 1,943,711

CLOTH MEASURING MACHINE

Walter E. Aeschbach, St. Louis, Mo., assignor to The Measuregraph Company, St. Louis, Mo., a corporation of Delaware Application September 26, 1932
Serial No. 634,812

26 Claims. (Cl. 101—74)

The present invention relates to cloth measuring machines of the type in which cloth, ribbon or the like is drawn between two rollers, one of which, known as the measuring roller, is connected with and drives indicating mechanism as the roller is turned through frictional contact of cloth therewith, thereby indicating and informing the clerk operating the machine of the length of cloth which is drawn through the machine from the beginning of a measuring operation until the operation has stopped. Machines of this character are well known whereby such indications of measurement take place with the progress of the measuring operation.

Such machines in many cases have connected therewith a computing chart simultaneously operated with the indicator so as to bring indicia of cost of a measured length of cloth, at a plurality of prices, into view as the cloth passes through the machine and show computations at such plurality of prices for the measured length of cloth which is passed through the machine in any measurement. One example of a machine of this general character is shown in the patent to Hosch No. 1,369,663, issued February 22nd, 1921 and another in the patent to Vanderveld No. 1,420,612, issued June 20th, 1922.

In machines of this character it is desirable for accuracy and to eliminate overmeasurement that the cloth shall be started properly in the machine and this has been accomplished as shown in Patent No. 1,556,736, issued October 13th, 1925 to J. H. Wheeler, et al. With such accessory to the machine no extension of cloth beyond the side of the machine can occur which has not been measured by passing through the machine, and the matter of correctly starting the cloth so as not to get overmeasurement is taken care of.

It is of quite equal importance that there be a correct stopping of the machine at the end of a measuring operation in order that there shall be the exact length of goods desired and no more; for it is necessarily incumbent upon a retail merchant that there shall be at least full measure given, and in order that there shall be no error on the side of undermeasurement, it is quite probable and usual for a clerk to err on the side of overmeasurement with attendant loss to the store by reason thereof.

One major object and purpose of the present invention is to provide a mechanism to insure the proper stopping of the machine at the point where it should stop so as to avoid errors of overmeasurement. Another object of the invention is to print automatically and register the amount of the cloth measured and sold and to provide, in the machine, mechanism whereby such printing will not take place except when the machine is accurately stopped at the desired point so as to give exactly the length of cloth ordered and bought. The invention comprises many novel constructions and arrangements of parts for very effectively attaining these ends and purposes stated.

An understanding of the invention may be had from the following description, taken in connection with the accompanying drawings, in which, Fig. 1 is a longitudinal section and side elevation of a cloth measuring and computing machine equipped with my invention, the mechanism housed within the housing of the machine being shown in elevation.

Fig. 5 is a transverse section substantially on the plane of line 5—5 of Fig. 1, looking in the direction indicated by the arrows.

Fig. 6 is a similar section with the parts in a different position after the knife lever has been operated at the end of a measuring operation.

Fig. 7 is a fragmentary transverse section on the plane of line 7—7 of Fig. 1 looking in the direction indicated by the arrows, illustrating the parts when an attempt to print is made and the machine is not at a proper position.

Fig. 8 is a like section illustrating the position of the parts at the end of a measuring operation when the knife lever has been operated.

Fig. 9 is a still further similar section showing the normal position of the parts during the measuring operation.

Fig. 10 is a transverse section on the plane of line 10—10 of Fig. 1 looking in the direction indicated by the arrows.

Fig. 11 is a similar section showing the printing operation as it is performed at the end of a measuring operation, and Fig. 12 is a fragmentary detail of the paper tape operating mechanism, the paper tape being the material upon which the printing is done.

Like reference characters refer to like parts in the different figures of the drawings.

Figures 1, 2, 3, 4:
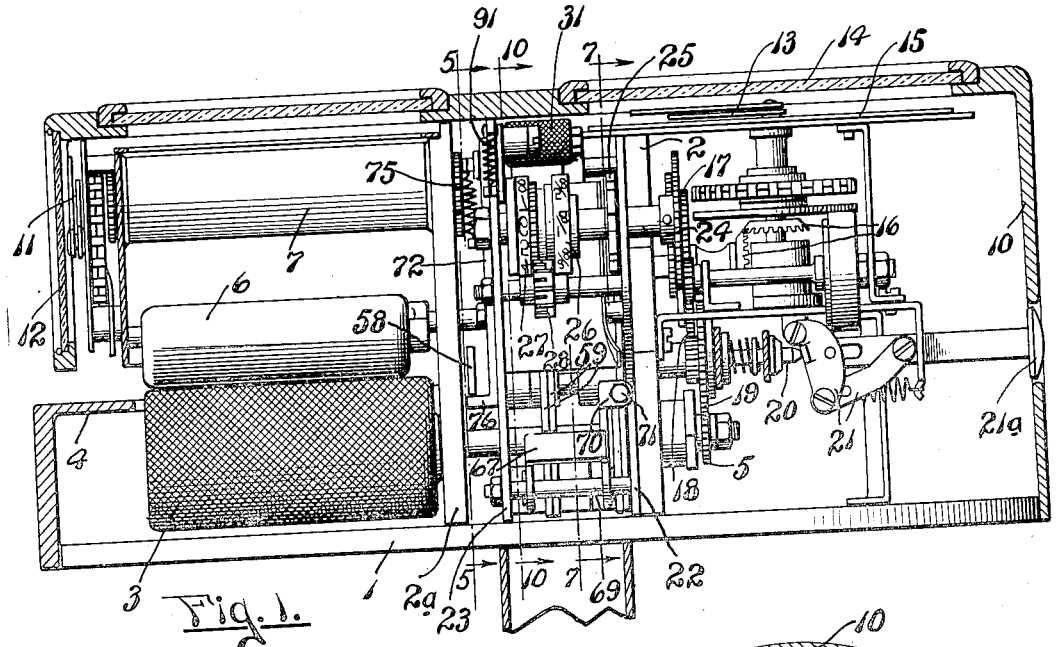
Fig. 2 is a fragmentary horizontal section and plan of one end of the machine.
Fig. 3 is an elevation illustrating the printing and control mechanism for insuring stopping of the machine at the desired point.
Fig. 4 is a fragmentary detail of a part used to operate the printing mechanism at the end of a measuring operation.

In the construction of the machine a supporting base 1 is used and vertical supporting plates 2 and 2a for carrying the mechanism are permanently secured to and extend upwardly from the base. The measuring roller 3 is mounted for rotation on a shaft which extends through the supporting plates, the roller being permanently secured on the shaft. Such measuring roller is housed within a housing member 4, the upper side of which provides a table over which the cloth is drawn, and which is slotted so that the upper portion of the measuring roller extends slightly therethrough. The end of the shaft which carries the measuring roller is equipped with a pinion 5. Above the measuring roller is the presser roller 6 and above the presser roller are computing chart carrying rollers 7 which carry a computing chart 8, the chart rolling from one roller 7 to the other or vice versa, to bring rows of computations of prices for different lengths of goods measured underneath horizontal windows 9 in the upper side of the main covering case 10 of the machine.

At the front vertical end of the machine is a customer's indicator 11 suitably driven and passing over an indicating dial located back of a vertical window 12 in the front end of the casing as shown in Fig. 1. At the rear portion of the machine, a horizontal indicator 13 is located below a second horizontal window 14 in the casing 10, the indicator hands of the indicator 13 passing over a dial 15. The indicator hands at 13 are driven through suitable gearing 16, 17, 18 and 19 connected with and driven by the pinion 5 which is rotated with the rotation of the measuring roller 3. Cloth drawn between the two rollers 3 and 6, with the presser roller 6 holding the cloth against the measuring roller 3, drives the parts and the indicator hands at 11 and 13 move simultaneously over both dials so as to show the measured length of cloth which has been and is being passed between the rollers. The gears 18 and 19 are carried on a shaft 20 which may be longitudinally operated by a reset mechanism indicated at 21 having a push button head 21a at its outer end for moving the same inwardly to free the mechanism from the measuring roller 3 and permit the indicating mechanism, charts and the like to return to initial zero position under spring influence.

All of the mechanism thus briefly described is old and well known and is fully disclosed in previous patents one of which is the patent to Hosch above referred to, and it is to machines of this character that my invention is to be applied.

Between the vertical supporting members 2 and 2a the measurement insurance stopping and printing devices are located. The construction comprises a unit which is adapted to be inserted between the vertical supports 2 and 2a. It includes spaced apart plates 22 and 23 connected together by suitable cross rods and the like. A shaft 24 is driven from the gearing previously described on which are a notched wheel 25 and two number wheels 26 and 27, the first of which makes one complete revolution with each unit measurement of cloth passing through the machine, and on which fractional indications of consecutive eighths of a unit measurement appear around the wheel. The other wheel 27 moves one step with each rotation of the wheel 26 and carries numbers indicative of consecutive units of measurement. The gear 28 is turned one step with each complete rotation of the measuring wheel 26 and serves to drive the wheel 27 so as to move the same the one step necessary with each unit measurement of cloth passing through the machine.

A guide 29 for the paper tape is located back of the numbering wheels 26 and 27, the tape being of a width equal to the combined widths of the two wheels. It passes therefrom between two rollers 30 and 31 and is a double tape, one thickness of which is carbon coated at its inner side and the other being of plain paper.

This roll 33 of tape is held in a substantially U-shaped housing 34 located underneath the base 1 (Fig. 10), and having one side extending upwardly, as at 35, to complete a side of the enclosing casing of the mechanism. Said holder for the tape with said attached vertical side 35 is permanently secured in place, as shown in Fig. 10, by a releasable set screw 36 whereby the roll of tape may be renewed from time to time and threaded through the mechanism.

A supporting rod or shaft 37 extends between and is supported between vertical side plates 22 and 23 near their lower ends. On the same a dog 38 is loosely mounted at its lower end and extends upwardly, terminating at its upper end in an inturned tongue 39 which extends toward the notched wheel 25. Such wheel 25 is provided with eight equally spaced apart notches, any one of which freely receives the end of the dog 39 if the wheel is in such position as to bring a notch directly opposite the tongue. Movement of the dog 38 in one direction is limited by a cross rod 40 (Fig. 8) and a light coiled spring 41 connected to the dog 38 tends to move the same away from the notched wheel 25, or to the position shown in Fig. 9.

Alongside of the dog 38 an irregularly shaped sheet metal member 42 is loosely mounted on shaft 37 at its lower end and at its upper end has a horizontal arm 43. It also has a slot 44 which lies directly alongside the dog member 38, a pin carried by the dog 38 passing through said slot. A coiled tension spring 45 connects at one end to said pin and at the other end to a pin carried at the free end of the arm 43. This normally causes the member 42 and the dog 38 to move together but permits movement of the member 42 a short distance with respect to the dog 38 (as shown in Fig. 7) should the tongue at 39 not mesh with one of the notches in the wheel 25. The member 42 is also provided with a finger 46 to one side of a notch or recess 47, the purpose of which will hereafter be described.

A shaft 48 extends through and is rotatably mounted on and between the plates 22 and 23 a short distance above the finger 46. It has an arm 49 extending therefrom. A pin 50 projecting laterally from the free end of the arm (Figs. 7, 8 and 9) enters the notch 47 so that on rocking the shaft 48 the member 42 and the connected dog 38 will be moved one direction or the other dependent upon the direction of rocking of the shaft 48. A member 51 is secured at one end of the rock shaft 48 and has a flange 52 (Fig. 3) turned at right angles therefrom which is divided to make a notch 53 therein.

At the close of a measuring operation, a hand operated lever 54, which is normally held in upper position, as shown in Fig. 5, by a spring 54a, is turned downwardly to notch the cloth, separate the rollers and set a brake to hold the measuring mechanism in the position to which it has been operated. This is all fully shown in prior constructions, one of which is illustrated in the previously referred to Hosch patent. The lever turns a shaft 55 on which a head 56 (Figs. 5 and 6) is secured and from which a pin 57 extends, it being located eccentrically to the axis of the shaft 55 as shown in Fig. 4, whereby the member 51 is turned from the position shown in Fig. 5 to that shown in Fig. 6. Release of the lever 54 permits the spring 54a to return the lever to upper position with a consequent return of the member 51 to the position shown in Fig. 5. Said member 51 has a finger 58 extending from the shaft 48 opposite the notch 53 previously described, the purpose of which will be hereafter pointed out.

Two printing bars 59 are likewise loosely mounted at their lower ends on the rod 37 and each at its upper end carries a striking block 60. Each also at one edge is provided with a retaining shoulder 61, at its opposite edge with an upwardly extending finger 63, below which is an arm 62 which extends substantial horizontally from the shaft 37. A finger 64 is carried by the rock shaft 48 to engage with both of the fingers 63 on the two printing bars, being of a width to cover both. Relatively heavy coiled springs 65 are connected at one end to the arms 62 of the two printing bars and at their other end to a stationary bar 66 which extends between the supporting plates 22 and 23. Normally the springs 65 when free to do so turn the printing bars in a clockwise direction from the position shown in Fig. 10 to that shown in Fig. 11 so as to strike the composite tape member against the numbering wheels 26 and 27.

During a measuring operation the printing bars are held away from the tape and the numbering wheels in the position shown in Fig. 1 by a latch bar 67 which is located horizontally underneath the retaining shoulders 61 (Fig. 10). The bar 67 is carried by vertical integral bars 68 at its ends which extend downwardly and are mounted for pivotal movement on a rod 69 carried by and between the supporting plates 22 and 23. One of said substantially vertical bars 68 extends above the latching bar 67 and is provided with a laterally turned ear 70 (Fig. 1) through which a screw 71 is threaded, the screw being in the same plane as the dog 38 so as to be engaged thereby when said dog moves from the position shown in Fig. 9 to that shown in Fig. 8, thereby releasing both of the printing bars 59 which will thereupon be moved rapidly by springs 65 to the printing position shown in Fig. 11.

On the outer side of the vertical supporting plate 23 (Fig. 5) a vertical bar 72 is located which has spaced slots 73 therein, studs or pins 74 extending from the plate 23 through said slots; and a spring 75 connected at one end with the bar and at the other end with one of said studs 74 elevates the bar 72 to the position shown in Fig. 6 when free to do so. At the lower end of bar 72 a tongue 76 is turned outwardly and at one side of the bar, between its ends, a triangular shaped projection 77 is formed. At the upper end of the bar a horizontal arm 78 extends toward the inner edge of the plate 23 and has a projection 79 extending downwardly from its lower side between its ends. At its free end it carries a pivoted dog 80 which is pulled inwardly by a spring 81 to engage with a ratchet wheel 82 fixed to the shaft 30a on which the previously described roller 30 is secured. At the outer end of the shaft 30a a disc 83 is secured, from which, at one point, a projection 84 extends which, with the parts in the position shown in Fig. 5, on rotation of the roller 30 in a counterclockwise direction will come against the projection 79.

There is also pivotally mounted on the outer side of the plate 23 (Fig. 5) a lever 85, the upper end of which is provided with a detent 86 to engage over the projection 77 and hold bar 72 in its lower position. The lower end of the member 85 has a coiled tension spring 87 connected thereto, the tendency of which is to move the detent 86 to engage with such projection.

An arc-shaped slot 88 is cut in the plate 23 through which a laterally extending rod 89 mounted on one of the printing bars 59 extends so that, on movement of the printing bars from the position shown in Fig. 10 to that shown in Fig. 11, such rod engages with the lower portion of the member 85, disengages detent 86 from the projection 77 and frees the bar 72 for elevation to the position shown in Fig. 6.

The printing tape of the composite nature described, one thickness of carbon paper and the other of plain paper, is held with a yielding tension against the roller 30 by the roller 31 which is mounted at one end of a lever 90 (Fig. 12), pivotally mounted between its ends and acted upon at its other end by a coiled tension spring 91.

During a cloth measuring operation the dog 38 and the part associated therewith occupy the position shown in Fig. 9, the printing bars 59 occupy the position shown in Fig. 10 and the lever 54 is in upper position as shown in Fig. 5. The cloth measuring operation may proceed to any length. It is designed with this machine that the major portion of all measurements shall consist of unit lengths or yards plus fractions of a yard, either one-eighth or multiples of one-eighth of a yard, and with any measurement when the indicators are exactly on unit lengths or unit lengths plus fractions which are one-eighth or multiples of one-eighth of a yard, the notched wheel 25 will be located as shown in Fig. 8, that is, with a notch positioned to receive the tongue 39 of dog 38.

When the indicator is as described and the wheel 25 properly located as shown in Fig. 8, depressing the lever 54, which takes place at the end of every measuring operation, notches the cloth, separates the measuring and presser roller and sets a brake. At the same time the shaft 55, head 56 and pin 57 thereon are moved so as to rock the shaft 48 lifting the free end 58 of the member 51 to the position shown in Fig. 6. Rocking the shaft 48 moves the arm 49 from the position shown in Fig. 9 to that shown in Fig. 8, provided the tongue 9 has a recess or notch in the wheel 25 to receive it. This is caused by the pin or rod 50 engaging against the inclined side of the notch or recess 47 to thereby turn member 42 in a clockwise direction and draw the dog 38 with it to the position shown in Fig. 8, the tongue 39 entering a notch in the wheel 25. The movement of the dog 38 to the position shown in Fig. 8 brings an edge thereof against an end of the screw 71, moving the latch bar 67 out from under the shoulders 61 or from the position shown in Fig. 10 to that shown in Fig. 11 and releases the printing bars 59 so that they are turned with considerable force in a clockwise direction and the striking blocks 60 strike and press the tape against the numbering wheels which, as they have turned simultaneously with the indicators during the measuring operation, carry the figures of measurement of cloth which has taken place; and the measured lengths of cloth are printed on the plain section of the tape.

With the movement of the printing bars 59, rod 89 moves to engage the lever 85 releasing the detent 86 from the projection 77 whereupon bar 72 moves upwardly under the influence of spring 75 to the position shown in Fig. 6. Such upward movement carries the pivoted dog 80 from one tooth of the ratchet wheel 82 to the next succeeding tooth.

With the return of the lever 54 to upper position under the influence of spring 54a, rotation of the shaft 55 returns the member 51 to the position shown in Fig. 5. The part 58 engaging with the tongue 76 draws the bar 72 downwardly and the dog 80 turns the ratchet wheel a step, thereby rotating the roller 30 in a counterclockwise direction and pushing the tape which has been flush with the upper edge of the guide 32 a short distance upwardly so that it may be grasped by the fingers, drawn out and the printed portion torn off to make a sales ticket of the amount measured and sold. The member 85, having been released by the rod 89, will turn back to its original position under the influence of spring 87 and detent 86, engaging with the projection 77, again holds the bar 72 in its down position.

Also, the rocking in a reverse direction of the rock shaft 48 accompanying the return of the lever 54 to its upper position, turns the arm 49 in a clockwise direction so that pin 50 engages with projection 46 and moves the member 42 back to the position shown in Fig. 9 with an accompanying movement of the dog 38 and, finger 64 engaging both of the fingers 63 (Fig. 10), moves the printing bars 59 back to the position shown in Fig. 10, the latch bar 67 engaging underneath the shoulder 61 and holding the bars in their inoperative position as shown in Fig. 10. Such return movement of the printing bars 59 releases the lever 85 as previously described.

At the end of a measuring operation, after the machine is stopped in a proper position, the lever 54 pushed downwardly and then released, the projecting upper end of the tape is grasped and pulled upwardly rotating the roller 30 thereby turning the disc 83 until the projection 84 engages against the projection 79 whereupon the part of the tape which has been pulled outwardly is torn across at the upper end of the guide 32. The roller 30 thereafter cannot turn any farther until the lever 54 has been again depressed on the next succeeding operation which results in an upward movement of the bar 72 and a release of the stop projection 79 from the projection 74, as in Fig. 6; and a rotation for a short distance of the wheel 30 and the attached disc 83 when the dog 80 turns the same on the downward movement of the bar 72 from the position shown in Fig. 6 to that shown in Fig. 5. Such rotation of the wheel 30 projects the tape a short distance above the upper end of the guide 32 so that it may be grasped at the end of the operation and after the printing has occurred, pulled out and torn off, the slip printed showing the measurement of cloth which has been made.

If, however, the operator of the machine does not stop at the right point desired and is to one side or the other thereof, when the lever 54 is depressed the tongue 39 of the dog will strike the wheel 25 between the notches and the dog 38 will not move far enough to engage the end of the screw 71 and no printing will take place. The bar 72 will not be released, and the end of the tape will not be projected a short distance above the guide 32. There will be complete inoperation of the printing mechanism though the machine may be operated to notch the cloth separate the rollers and set the brake.

There is therefore a complete bringing to notice of the operator of a wrong measurement and a wrong stopping of the machine when no printed ticket showing the amount of goods sold can be obtained at the end of a measuring operation. It is of course to be understood that there is some small measure of tolerance permitted, the notches in the wheel 25 being slightly wider than the width of the dog 39 so that it is not especially hard to get the machine to perform its printing operation, but any reckless or careless disregard of the indicators, whether they are substantially at the point they should be or not will be checked and the sales operator of the machine compelled to bring the machine to a correct stop and not be more or less careless with regard thereto.

Accordingly there is a check upon the clerk operating the machine, necessitating care in the operation so as to stop at a desired place, exactly at a full yard indication or on a fraction which is a multiple of one-eighth of a yard, otherwise there will be no printing of the ticket, nor any possibility of withdrawing a sales ticket with the amount sold printed thereon; and as the ticket is to be withdrawn and go with the purchase, it is an assurance that the clerk will be much more careful in measurements and in stopping the machine at the proper place than if such could be performed and be longer than the amount purchased without any check against careless stopping.

The construction described is of a very practical and serviceable nature and has proved very satisfactory, both for printing a sales ticket at the end of a measuring operation and for a check upon the machine operator with assurance that the operator will not give a slight overmeasurement or undermeasurement. The invention has been described in connection with a well known type of cloth measuring and computing machine which has been widely and extensively used for many years. All of the elements in detail of old construction are not specifically described herein as the same are common and well known, but only sufficient has been outlined to show the positioning of construction of the invention which has been applied to such machines. The invention, while shown in a practical and operative form, is capable of much variation in detail of structure and is, therefore, not to be restricted to the specific form shown but is to be considered comprehensive of all forms of structure coming within the scope of the appended claims which define the invention.

I claim:

1. In a cloth measuring machine, a measuring roller adapted to be driven by cloth drawn through the machine, numbering wheels driven by the measuring roller, a sales ticket guide for guiding a ticket into proximity with one side of the numbering wheels, means for striking the ticket against said numbering wheels and position means for rendering said last mentioned means inoperative except at selected positions of the measuring roller and numbering wheels.

2. In a cloth measuring machine, a rotatable measuring roller, numbering wheels driven by the measuring roller, striking members normally held away from the numbering wheels but releasable to permit the same to move toward said numbering wheels, means for releasing said striking members and means for positively preventing said release except at selected and predetermined positions of said wheels.

3. In a cloth measuring machine, a rotatable measuring roller, numbering wheels driven by the measuring roller, pivotally mounted striking members, latching means for holding the same away from the numbering wheels and means for operating the latching means to release the striking members, combined with spring means connecting with the striking members to move the same against the numbering wheels.

4. In a cloth measuring machine, a rotatable measuring roller, numbering wheels driven thereby, pivotally mounted striking members, spring means acting thereon tending to move the striking members toward and against said numbering wheels, latching means for holding the striking members a distance away from the numbering wheels, manually operable means for releasing said latching member, and spring means for automatically returning said manually operable means and striking members to initial positions whereby the striking members are automatically latched.

5. In a cloth measuring machine, a measuring roller, an indicator driven thereby, numbering wheels driven by the measuring roller, movably mounted striking members adapted to move a ticket and a carbon printing element toward and strike the same against the measuring wheels, means for releasing the striking members, and means for preventing such release except when the indicator is at any one of a number of predetermined positions showing either unit measurements and/or aliquot parts thereof.

6. In a cloth measuring machine, a measuring roller adapted to be driven by cloth drawn through the machine, numbering wheels driven by the measuring roller, pivotally mounted striking members having striking ends located adjacent the numbering wheels, spring means tending to move the striking members toward and against the numbering wheels, a latch for holding the striking members away from said wheels, a pivotally mounted cloth notching lever, spring means for returning said cloth notching lever to normal position, and means operated by said notching lever for releasing the latch to free said striking members on manual operation of the lever and for moving the striking members away from the numbering wheels and relatching them on return of the notching lever to normal position, as specified.

7. A construction containing the elements in combination defined in claim 6, combined with means for automatically preventing operation of said latching means and release of the striking members except at predetermined selected positions of said measuring roller and numbering wheels.

8. In a cloth measuring machine, a rotatable measuring roller, numbering wheels having numbers thereon rotatably mounted and driven by the measuring roller, means for carrying a tape into the machine and guiding it to one side of and adjacent said numbering wheels, said tape including a section to be printed and a carbon section interposed between the first section and the numbering wheels, striking members releasable to strike said tape against the numbering wheels, means for holding the striking members away from the numbering wheels and manually operable means for releasing said holding means to free the striking members.

9. A construction containing the elements in combination defined in claim 8 combined with means for returning said striking members to initial position and for relatching the same in said position.

10. In a cloth measuring machine, a movable indicator operable with the operation of the machine, numbering wheels operable with the operation of the machine and in synchronism with said indicators, means for printing a ticket against said numbering wheels at the end of a measuring operation, and means for preventing operation of said ticket printing means except when the indicator shows either units of measurement and/or aliquot parts thereof.

11. In a cloth measuring machine, a measuring roller, numbering wheels driven by the measuring roller, pivotally mounted spring actuated striking members mounted adjacent the numbering wheels, latching means holding said striking members a distance away from the measuring wheels, a notching lever pivotally mounted and movable in a downward direction, spring means for returning the notching lever to upper position when released, a shaft rocked by the notching lever, and means interposed between the shaft and latching means for releasing said latch on downward movement of the latching member, thereby releasing the striking members, and for returning the striking members to initial position to relatch the same upon release of the notching lever.

12. A construction containing the elements in combination defined in claim 11, said measuring machine having an enclosing housing, and a guide in said housing for guiding a tape including a carbon element associated therewith between the striking member and said numbering wheels, as and for the purpose specified.

13. In a measuring machine, a measuring roller, rotatably mounted numbering wheels driven by the measuring roller including a shaft, a disc on said shaft having a plurality of equally spaced notches in the periphery thereof movably mounted striking members mounted adjacent the numbering wheels, spring means for moving said striking members against the numbering wheels when free to do so, a latch for holding said striking members away from the numbering wheels, manually operable means to release said latch, a dog having a tongue at one end to enter any one of the notches in said notching wheel associated with the striking members, and means associated with said dog whereby the striking members are maintained in latched position except upon registry of the tongue with a notch in said disc.

14. In a measuring machine, a rotatably mounted measuring roller, numbering wheels driven thereby, a rotatable disc associated with the numbering wheels and driven by the measuring roller having a plurality of equally spaced notches in its periphery, striking members pivotally mounted and having free ends located opposite the numbering wheels, a dog pivotally mounted adjacent the striking members having a tongue at its free end located opposite said notched wheel, a latching member associated with said striking members to hold the same away from the numbering wheels, a rock shaft, a manually operated lever connected thereto operable in a downward direction to rock the same, an arm on the rock shaft, spring means for pulling the lever to an upper position, said dog being engageable against the latching member when moved to a predetermined position to thereby unlatch the striking members, combined with a yielding connection between said arm on the rock shaft and said dog to draw the tongue on said dog toward said notching wheel on downward operation of said lever.

15. In a cloth measuring machine, a measuring roller, numbering wheels driven thereby, a notched disc rotatable with the numbering wheels, pivotally mounted striking members, spring means for drawing the same toward the numbering wheels, a latch for holding the striking members away from the numbering wheels, a dog having a tongue at one end adapted to enter a notch in the notched wheel, and means for unlatching the striking members as said tongue is moved into a notch of said notched disc.

16. In a cloth measuring machine, measuring mechanism including a rotatable measuring roller and indicators driven by the measuring roller, a housing enclosing said measuring mechanism, movable numbering wheels driven by the measuring roller, a ticket guide for guiding a ticket and a carbon element housed within said housing and adapted to guide the same to one side of the numbering wheels, striking members between which and the numbering wheels said ticket is guided, means for releasably holding the striking members away from the numbering wheels, manually operable means for releasing the striking members, and spring means acting on the striking members to draw them forcefully against the numbering wheels and the ticket and carbon element interposed between the same.

17. In a cloth measuring machine, a measuring roller, an indicator driven thereby, numbering wheels driven by the measuring roller in synchronism with the indicator, a tape mounted to be drawn through the measuring machine adjacent said numbering wheels, movably mounted striking members, a latch for holding the striking members away from the numbering wheels and tape and means for releasing said striking members, there being a carbon element between the striking members and wheels whereby on release of the striking members the numbers on said numbering wheels opposite the striking members are printed on the tape.

18. In a cloth measuring machine, a rotatable measuring roller, an indicator and numbering wheels driven by said roller in synchronism, movably mounted striking members, spring means acting thereon tending to move the said members toward and against said numbering wheels, a housing enclosing the parts of the measuring machine, a tape passing through said numbering wheels and between the same and the striking members, a carbon element between the striking members and tape, means for releasing the striking members, means for returning said first mentioned means to initial position and relatching the striking members, and means for automatically projecting the tape a short distance beyond the casing, whereby the same may be grasped and drawn from the casing.

19. A construction containing the elements in combination defined in claim 18, combined with means for limiting the extent that the tape may be withdrawn from the casing.

20. In a cloth measuring machine, a rotatable measuring roller, a shaft driven thereby, a notched disc on said shaft, a movably mounted dog to engage in the notches of said disc, means normally holding said dog away from the disc, means for notching cloth drawn over said measuring roller at the end of a measuring operation, and manually operable means for moving said dog toward the notched disc on operation of said cloth notching means, said dog entering a notch in the disc upon operation of the measuring machine to measure substantially exact unit lengths of cloth and/or selected aliquot parts of said unit lengths of measurement.

21. In a cloth measuring machine having a measuring mechanism driven by cloth drawn therethrough and a lever which is actuated to notch the cloth, the combination of, a numbering unit driven in synchronism with said measuring mechanism, guide means whereby a sales ticket may be juxtaposed to said numbering unit, spring operated means for causing action on said sales ticket by the said numbering unit, and release means operated by the movement of the said notching lever to permit operation of said spring operated means.

22. A combination of elements as set forth in claim 21 but also having additional means for moving said sales ticket after action is had thereon.

23. In a measuring machine having a spring returned notching lever and ticket printing means, the combination of, means for partially ejecting the ticket from the position it has during the printing operation and means operated by the return movement of the notching lever for operating the first mentioned means.

24. A combination of elements as set forth in claim 23 but also having a yielding connection included in said ticket printing means and means for preventing operation of said ticket printing means at certain predetermined times, said prevention means causing actuation of the same yielding means.

25. In a machine of the class described, a measuring mechanism, invisible indicia synchronously driven by said measuring mechanism, means to render said indicia visible, and additional means to positively prevent operation of said last mentioned means except at certain predetermined positions for the purpose described.

26. In a measuring mechanism of the class described having a casing with a vertical opening in one side thereof, said casing receiving the measuring mechanism therein, said measuring mechanism including a ticket printing mechanism, said ticket printing mechanism being accessible through said opening, and a removable closure member for said opening, said closure member having a recess therein for receiving a plurality of tickets therein.

WALTER E. AESCHBACH.